(12) United States Patent
Sunohara

(10) Patent No.: US 10,748,498 B2
(45) Date of Patent: Aug. 18, 2020

(54) ACTIVE MATRIX SUBSTRATE DISPLAY DEVICE

(71) Applicant: SHARP KABUSHIKI KAISHA, Sakai, Osaka (JP)

(72) Inventor: Hideaki Sunohara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/188,703

(22) Filed: Nov. 13, 2018

(65) Prior Publication Data

US 2019/0147817 A1    May 16, 2019

(30) Foreign Application Priority Data

Nov. 15, 2017    (JP) .................. 2017-220100

(51) Int. Cl.
| | |
|---|---|
| G02F 1/1362 | (2006.01) |
| G09G 3/36 | (2006.01) |
| G02F 1/1343 | (2006.01) |
| G02F 1/1345 | (2006.01) |
| G02F 1/1368 | (2006.01) |

(52) U.S. Cl.
CPC ......... *G09G 3/3655* (2013.01); *G02F 1/1343* (2013.01); *G02F 1/1345* (2013.01); *G02F 1/1368* (2013.01); *G09G 3/3614* (2013.01); *G09G 3/3688* (2013.01); *G02F 2201/121* (2013.01)

(58) Field of Classification Search
CPC ..................................... G02F 1/1368
See application file for complete search history.

(56) References Cited

U.S. PATENT DOCUMENTS

2002/0041281 A1    4/2002  Yanagi et al.
2017/0139298 A1*   5/2017  Kimoto ................. G02F 1/1368

FOREIGN PATENT DOCUMENTS

JP    2002-116739 A    4/2002

\* cited by examiner

*Primary Examiner* — Abdul-Samad A Adediran
(74) *Attorney, Agent, or Firm* — ScienBiziP, P.C.

(57) ABSTRACT

A lower input electrode is electrically connected to a lower end portion of a common electrode. An upper input electrode and an output electrode are electrically connected to an upper end portion of the common electrode. The lower input electrode, the upper input electrode, and the output electrode are electrically connected to one another through only the common electrode.

6 Claims, 7 Drawing Sheets

ACTIVE MATRIX SUBSTRATE DISPLAY DEVICE

BACKGROUND

1. Field

The present disclosure relates to an active matrix substrate, a display device, and a control method.

2. Description of the Related Art

These days, various liquid crystal display modes such as a fringe field switching (FFS) mode are known. Liquid crystal is driven by an electric potential difference (driving voltage) between a pixel electrode (also referred to as a display electrode) and a common electrode (also referred to as a counter electrode). Therefore, the electric potential of the common electrode is a matter of consideration similarly to the electric potential of the pixel electrode.

For example, Japanese Unexamined Patent Application Publication No. 2002-116739 (published on Apr. 19, 2002) discloses a configuration in which a level of the electric potential of the common electrode varies in accordance with a length of a refresh period.

However, in the FFS mode liquid crystal display device according to the related art, a problem arises in that the electric potential of the common electrode fluctuates in the liquid crystal display device due to (1) a parasitic capacitance between the common electrode and scanning signal lines and data signal lines for driving the pixel electrodes, because the pixel electrodes and the scanning signal lines and data signal lines overlap the common electrode on the same substrate and (2) a signal delay caused by an electric resistance, because the common electrode is formed of a transparent conductive material having a low conductivity. As a result of fluctuation of the electric potential of the common electrode, the driving voltage becomes unstable, thereby causing a problem of the image displayed appearing colored. Such coloring of a display image is referred to as a greenish mode since the image looks mostly greenish.

SUMMARY

It is desirable to realize a FFS mode liquid crystal display device in which the greenish mode rarely occurs.

An active matrix substrate for a display device according to an aspect of the present disclosure includes a display region and a picture-frame region. In the display region, (a) a plurality of scanning signal lines, (b) a plurality of data signal lines crossing the scanning signal lines, and (c) a common electrode overlapping the scanning signal lines and the data signal lines and formed of a transparent conductive material are disposed. In the picture-frame region, (a) a first input electrode electrically connected to a first end portion of the common electrode, (b) a second input electrode electrically connected to a second end portion of the common electrode opposite to the first end portion, and (c) an output electrode electrically connected to the second end portion are disposed. The first input electrode, the second input electrode, and the output electrode are electrically connected to one another through only the common electrode.

BRIEF DESCRIPTION OF THE DRAWINGS

FIGS. 7A and 7B are diagrams illustrating examples of control for keeping an electric potential of the common electrode such that the electric potential of the common electrode corresponds to the target waveform in the comparative example illustrated in FIG. 6, in which FIG. 7A is a diagram illustrating an example of control in a case where a first input signal and a second input signal are target waveforms, and FIG. 7B is a diagram illustrating an example of control in a case where the second output signal is the target waveform.

DESCRIPTION OF THE EMBODIMENTS

Embodiment 1

Hereinafter, an embodiment of the present disclosure will be described in detail.

Figure 1:
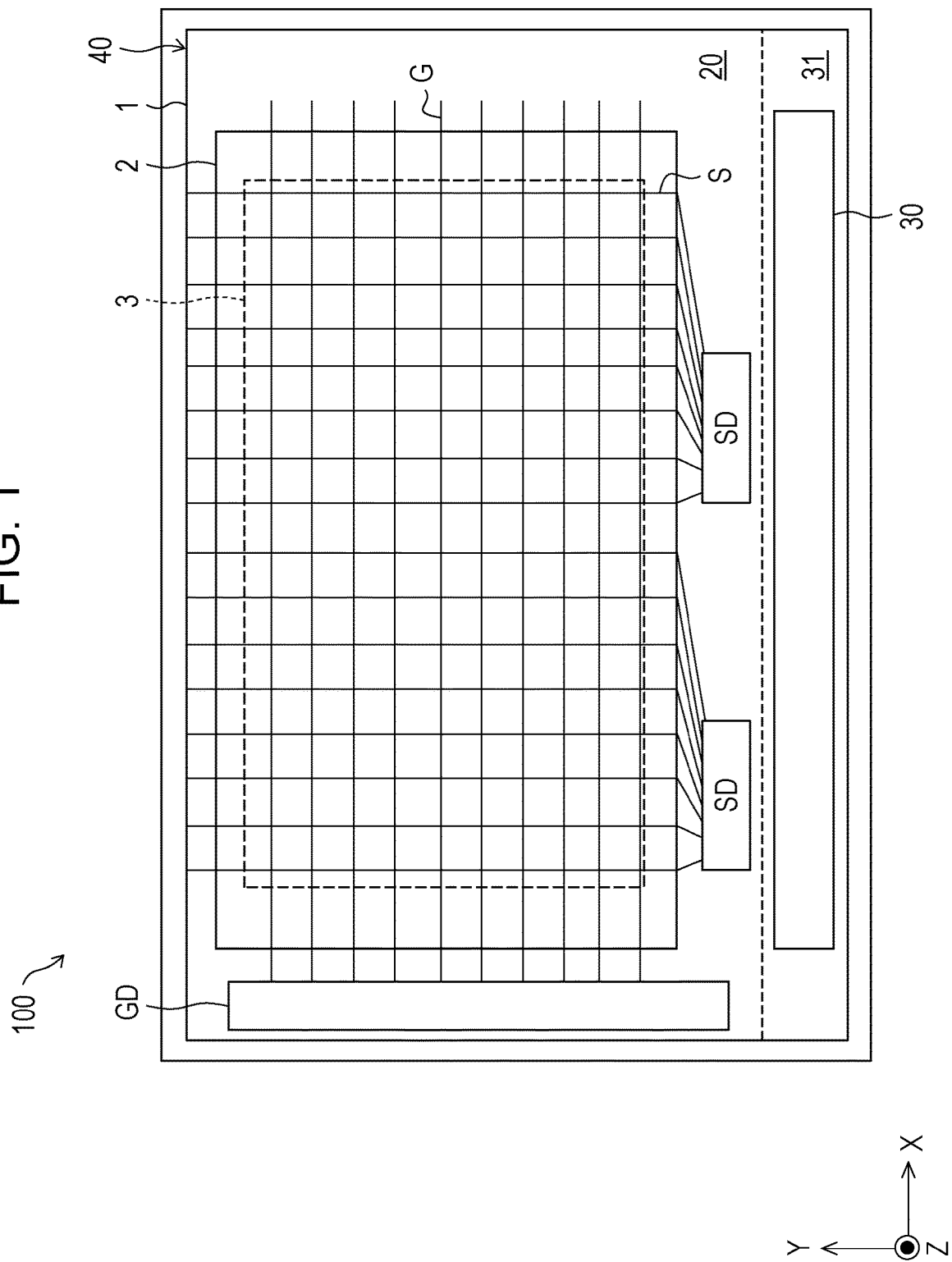
FIG. 1 is a diagram illustrating an example schematic configuration of a liquid crystal display device according to embodiments of the present disclosure.

FIG. 1 is a diagram illustrating an example schematic configuration of a liquid crystal display device 100 according to Embodiment 1.

As illustrated in FIG. 1, the liquid crystal display device 100 according to Embodiment 1 may be configured to include an active matrix substrate 40, a counter substrate (not shown), a liquid crystal (not shown) held between the counter substrate and the active matrix substrate 40, and the like. The liquid crystal display device 100 according to Embodiment 1 is a FFS mode liquid crystal display device.

Active Matrix Substrate

The active matrix substrate 40 is an active matrix substrate for the FFS system, which includes an insulating substrate 1 and includes a display region 3 and a picture-frame region 20 surrounding the display region 3.

The following elements are disposed in the display region 3: a plurality of scanning signal lines G; a plurality of data signal lines S intersecting the scanning signal lines G; switching elements (not shown) corresponding to respective intersections of the scanning signal lines G and the data signal lines S; and pixel electrodes (not shown) corresponding to respective switching elements. The scanning signal lines G and the data signal lines S are formed of a metal such as copper or tungsten. The switching elements are, for example, thin film transistors or the like.

A common electrode 2 and an insulating layer (not shown) are further disposed in the display region 3. The insulating layer is held between the common electrode 2 and the scanning signal lines G and data signal lines S. The common electrode 2 overlaps the scanning signal lines G, the data signal lines S, the switching elements, and the pixel electrodes. In general, the common electrode is formed so as to cover the widest possible range of the entire surface of the display region 3. The common electrode 2 is formed of a transparent conductive material such as indium titanium oxide (ITO). Since such a transparent conductive material is usually a metal oxide, the electric conductivity of the material is lower than that of a metal. The common electrode 2 is normally formed to be wider than the display region 3.

A driving circuit GD, driving circuits SD, and a feedback circuit 30 are mounted in the picture-frame region 20. The driving circuit GD drives the scanning signal lines G. The driving circuits SD drive the data signal lines S. The feedback circuit 30 performs feedback control on the electric potential supplied to the common electrode 2. The circuits GD, SD, and 30 may be monolithically formed on the insulating substrate 1, or may be formed on a separate substrate. FIG. 1 illustrates a configuration example in which the feedback circuit 30 is formed on the separate substrate and is mounted in a feedback circuit mount region 31 (a partial region of the picture-frame region 20).

Figure 2:
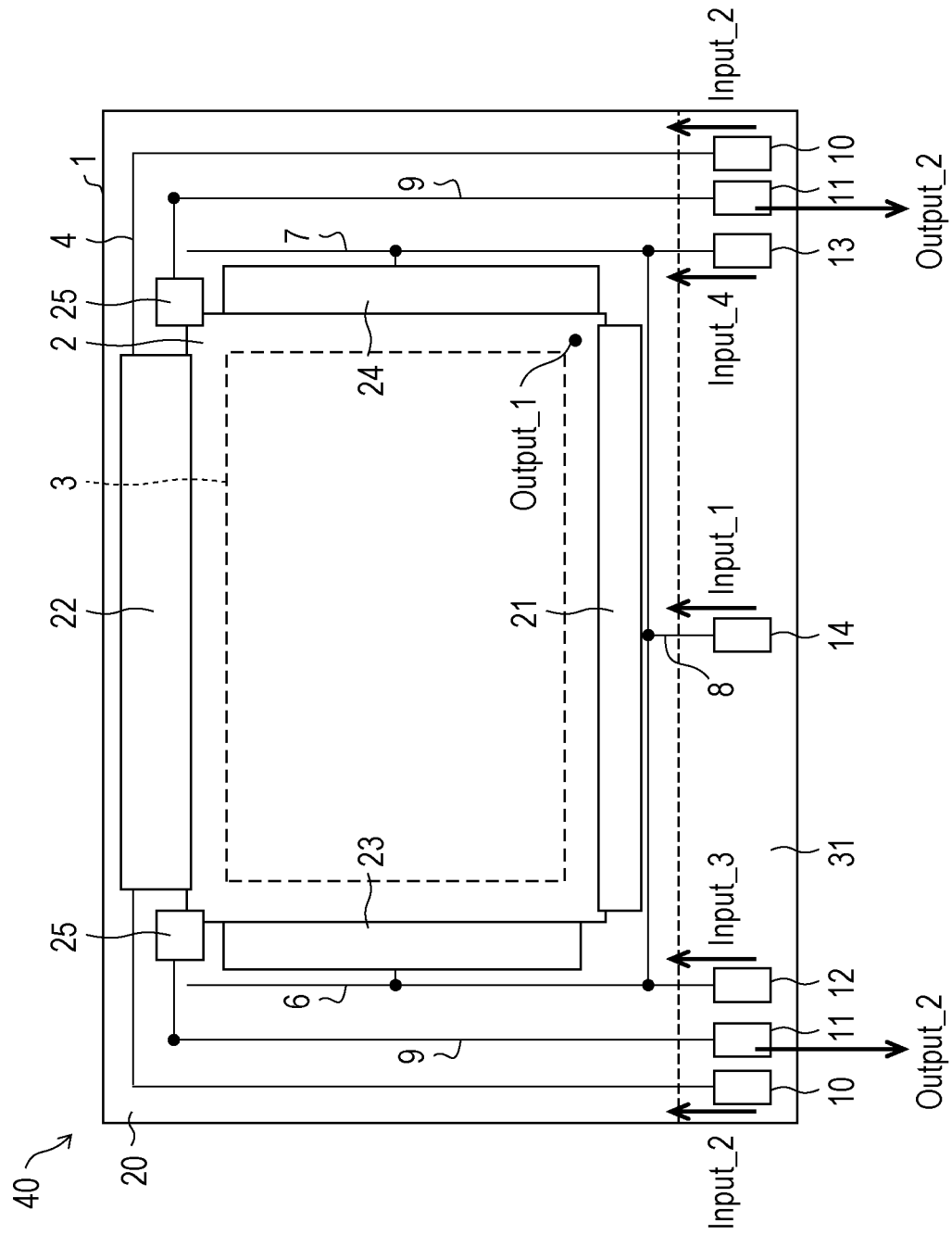
FIG. 2 is a diagram illustrating an example schematic configuration of the active matrix substrate illustrated in FIG. 1 according to an embodiment of the present disclosure, in which an input signal is input to a common electrode and an output signal is output from the common electrode.

Wiring, electrodes, and terminals described later with reference to FIG. 2 are further disposed in the picture-frame region 20. Other constituent elements may be disposed or mounted in the picture-frame region 20.

FIG. 2 is a diagram illustrating an example schematic configuration of the active matrix substrate 40 illustrated in FIG. 1 according to Embodiment 1. FIG. 2 illustrates only the common electrode 2 and constituent elements for controlling the electric potential of the common electrode 2, and does not illustrate other constituent elements.

As illustrated in FIG. 2, electrodes 21 to 24, wires 4 and 6 to 9, and terminals 10 to 14 are disposed in the picture-frame region 20. A portion of the picture-frame region 20 located under the common electrode 2 is the feedback circuit mount region 31 in which the feedback circuit 30 is to be mounted. The terminals 10 to 14 are disposed in the feedback circuit mount region 31.

The lower input electrode 21 (first input electrode) is electrically connected to the lower end portion (first end portion) of the common electrode 2 and is electrically connected to the lower input terminal 14 (first input terminal) through the lower input wire 8 (first input wire). The lower end portion of the common electrode 2 is the end portion closest to the feedback circuit mount region 31 among the end portions of the common electrode 2.

The upper input electrode 22 (second input electrode) is electrically connected to the upper end portion (second end portion) of the common electrode 2 and is electrically connected to the upper input terminals 10 (second input terminal) through the upper input wire 4 (second input wire). The upper end portion of the common electrode 2 is the end portion farthest from the feedback circuit mount region 31 among the end portions of the common electrode 2. Further, the upper end portion of the common electrode 2 is located opposite to the lower end portion of the common electrode 2.

The left input electrode 23 (third input electrode) is electrically connected to the left end portion (third end portion) of the common electrode 2 and is electrically connected to the left input terminal 12 (third input terminal) through the left input wire 6 (third input wire). The left end portion of the common electrode 2 is located between the upper end portion and the lower end portion of the common electrode 2.

The right input electrode 24 (fourth input electrode) is electrically connected to the right end portion (fourth end portion) of the common electrode 2 and is electrically connected to the right input terminal 13 (fourth input terminal) through the right input wire 7 (fourth input wire). The right end portion of the common electrode 2 is located between the upper end portion and the lower end portion of the common electrode 2. Further, the right end portion of the common electrode 2 is located opposite to the left end portion of the common electrode 2.

Each output electrode 25 is electrically connected to the upper end portion (second end portion) of the common electrode 2 and is electrically connected to the output terminal 11 through the output wire 9.

In the configuration example illustrated in FIG. 2, the lower input electrode 21 is electrically connected to the left input electrode 23 and the right input electrode 24. The electrical connection may be realized, for example, as illustrated in FIG. 2, by indirectly connecting the lower input wire 8 through the left input wire 6 and the right input wire 7. Alternatively, for example, although not shown, this electrical connection may be realized by integrally forming the lower input electrode 21, the left input electrode 23, and the right input electrode 24. Since the lower input electrode 21 is electrically connected to the left input electrode 23 and the right input electrode 24, the left input terminal 12 and the right input terminal 13 may be integrated into the lower input terminal 14.

Since the common electrode 2 is formed of a transparent conductive material, the electric conductivity of the material is relatively low. Therefore, two electrodes electrically connected through only the common electrode 2 may have different electric potentials from each other since the electric resistance between the electrodes is large. The two electrodes, which have different electric potentials from each other as described above, can be regarded as electrodes which are electrically separated from each other. On the other hand, two electrodes connected directly or through the wires 4 and 6 to 9 having relatively low electric conductivities have electric potentials substantially the same since the electric resistance between the electrodes is small. The two electrodes whose electric potentials are substantially equal to each other are electrodes which are electrically connected to each other.

For example, in the configuration example illustrated in FIG. 2, it can be regarded that the lower input electrode 21 is electrically separated from the upper input electrode 22 and the output electrode 25. Further, it can be regarded that the upper input electrode 22 is electrically separated from the lower input electrode 21, the left input electrode 23, the right input electrode 24, and the output electrode 25. It can be regarded that the left input electrode 23 is electrically separated from the upper input electrode 22 and the output electrode 25. It can be regarded that the right input electrode 24 is electrically separated from the upper input electrode 22 and the output electrode 25. It can be regarded that the output electrode 25 is electrically separated from the lower input electrode 21, the upper input electrode 22, the left input electrode 23, the right input electrode 24.

Since the common electrode 2 has a relatively low electric conductivity, a signal delay is likely to occur in the common electrode 2, and it takes time to cancel fluctuation in electric potential. The time to cancel the fluctuation in electric potential is generally longer than each scanning signal line driving period in which each scanning signal line G is driven. Thus, it is difficult to keep the electric potential of the common electrode 2 at a substantially consistent electric potential across the entire common electrode. Accordingly, the fluctuation in electric potential affects a display image to the extent that the fluctuation may be visible. Furthermore, the common electrode 2, the scanning signal lines G, and the data signal lines S are formed on the insulating substrate 1. Thus, a gap between the common electrode 2 and the scanning and data signal lines G and S is narrow, and as a result, parasitic capacitance is large therebetween. Due to the parasitic capacitance, fluctuation is more likely to occur in electric potential in the common electrode 2.

Input Signal and Output Signal

FIG. 2 also illustrates an input signal, which is input to the common electrode 2 illustrated in FIG. 1 according to Embodiment 1, and an output signal, which is output from the common electrode 2.

The feedback circuit 30 is mounted in the feedback circuit mount region 31 by solder, brazing material, or the like so as to be electrically connected to the terminals 10 to 14. In addition, the feedback circuit mount region 31 is a portion of the picture-frame region 20 located under the common electrode 2.

Therefore, the feedback circuit 30 is able to supply a first input signal Input_1 to the lower input electrode 21 through the lower input terminal 14 and the lower input wire 8. The lower input electrode 21 is able to send the input of the first input signal Input_1 to the lower end portion of the common electrode 2. In FIG. 2, the output electrode, which is connected to the lower end portion of the common electrode 2, is not provided, but such an output electrode may be provided. The first output signal Output_1 is an output signal that is to be output from the output electrode connected to the lower end portion of the common electrode 2. The wiring distance of the lower input wire 8 between the lower input electrode 21 and the lower input terminal 14 is the shortest among the input wires 4 and 6 to 8. Therefore, since the electric resistance between the lower input electrode 21 and the lower input terminal 14 is smallest, the first output signal Output_1 is likely to be the same as the first input signal Input_1.

The feedback circuit 30 is able to supply a second input signal Input_2 to the upper input electrode 22 through the upper input terminal 10 and the upper input wire 4. The upper input electrode 22 is able to send the input of the second input signal Input_2 to the upper end portion of the common electrode 2. The upper end portion of the common electrode 2 is able to output the second output signal Output_2 to the output electrode 25. The output electrode 25 is able to supply the second output signal Output_2 to the feedback circuit 30 through the output terminal 11 and the output wire 9. The wiring distance of the upper input wire 4 between the upper input electrode 22 and the upper input terminal 10 is the longest among the input wires 4 and 6 to 8. Therefore, since the electric resistance between the upper input electrode 22 and the upper input terminal 10 is largest, the second output signal Output_2 is likely to be different from the second input signal Input_2.

The feedback circuit 30 is able to supply a third input signal Input_3 to the left input electrode 23 through the left input terminal 12 and the left input wire 6. The left input electrode 23 is able to send the input of the third input signal Input_3 to the left end portion of the common electrode 2.

The feedback circuit 30 is able to supply a fourth input signal Input_4 to the right input electrode 24 through the right input terminal 13 and the right input wire 7. The right input electrode 24 is able to send the input of the fourth input signal Input_4 to the right end portion of the common electrode 2.

In the configuration example illustrated in FIG. 2, the third input signal Input_3 and the fourth input signal Input_4 are substantially the same as the first input signal Input_1. Further, the first input signal Input_1, the second input signal Input_2, the first output signal Output_1, and the second output signal Output_2 may be different from each other.

Comparative Example

Figure 6:
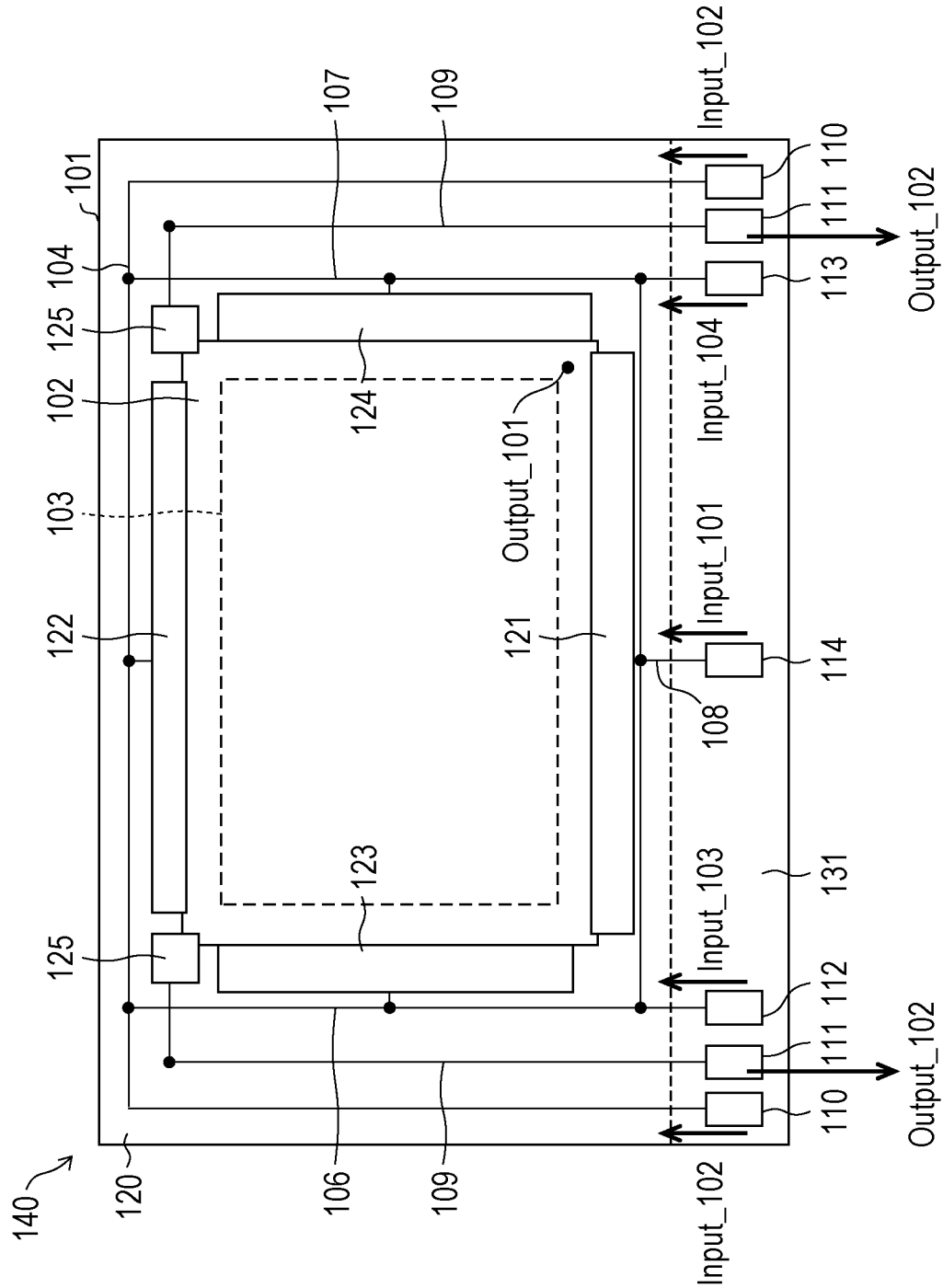
FIG. 6 is a diagram illustrating an example schematic configuration of an active matrix substrate according to a comparative example of the present disclosure.

FIG. 6 is a diagram illustrating an example schematic configuration of an active matrix substrate 140 according to a comparative example of the present disclosure. FIG. 6 illustrates only a common electrode 102 and constituent elements for controlling the electric potentials of the common electrode 102, and does not illustrate other constituent elements.

As illustrated in FIG. 6, the active matrix substrate 140 of the comparative example is an active matrix substrate for the FFS mode which includes an insulating substrate 101, a display region 103, and a picture-frame region 120.

A common electrode 102 and an insulating layer (not shown) are disposed in the display region 103.

Electrodes 121 to 124, wires 104 and 106 to 109, and terminals 110 to 114 are disposed in the picture-frame region 120. A portion of the picture-frame region 120 is a feedback circuit mount region 131 in which a feedback circuit is to be mounted. The terminals 110 to 114 are disposed in the feedback circuit mount region 131.

Comparing FIG. 2 and FIG. 6, the active matrix substrate 140 of the comparative example is different from the active matrix substrate 40 of the present embodiment in the following regard. The upper electrode 122 is electrically connected to the lower electrode 121, the left electrode 123, and the right electrode 124 through the wires 106 to 108. On the other hand, the active matrix substrate 140 of the comparative example has the same configuration as the active matrix substrate 40 of the present embodiment in other regards.

Therefore, in the configuration illustrated in FIG. 2, a first input signal Input_101 which is input to the common electrode 102 from the lower electrode 121 is the same as the following signals: a second input signal Input_102 which is input to the common electrode 102 from the upper electrode 122; a third input signal Input_103 which is input to the common electrode 102 from the left electrode 123; and a fourth input signal Input_104 which is input to the common electrode 102 from the right electrode 124.

Figure 7A:
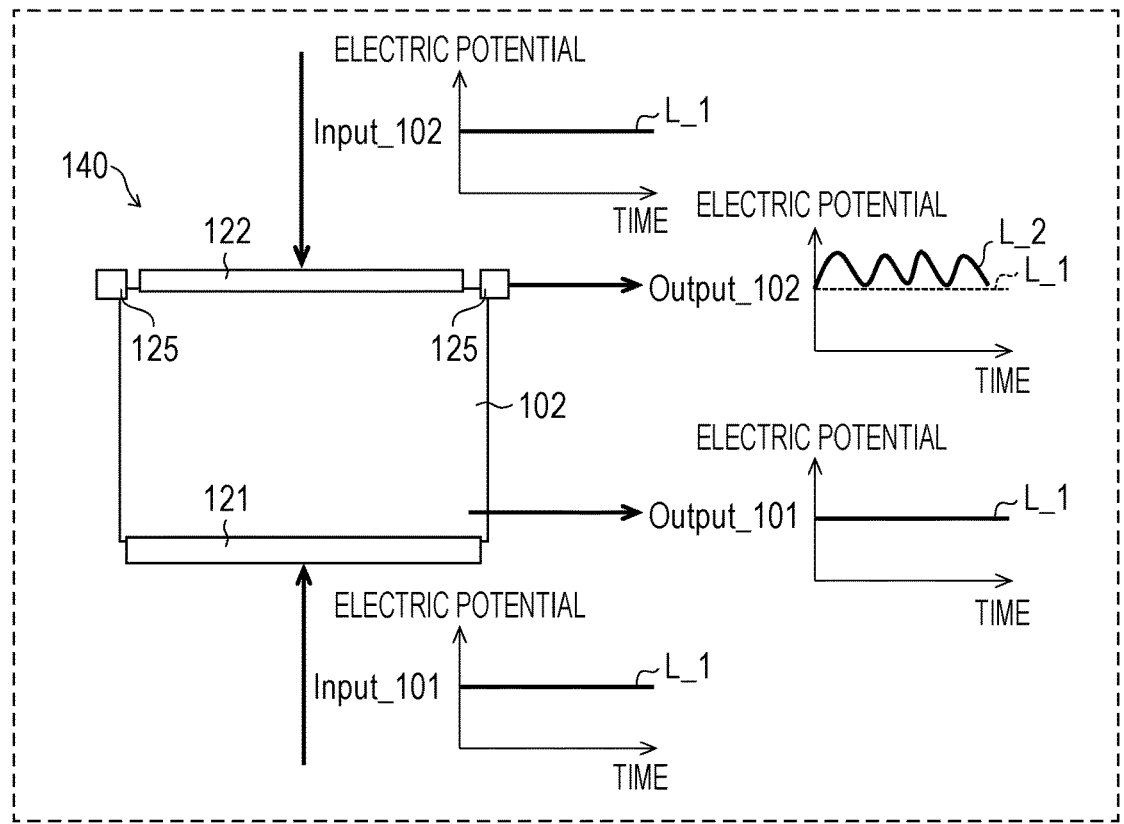
Figure 7B:
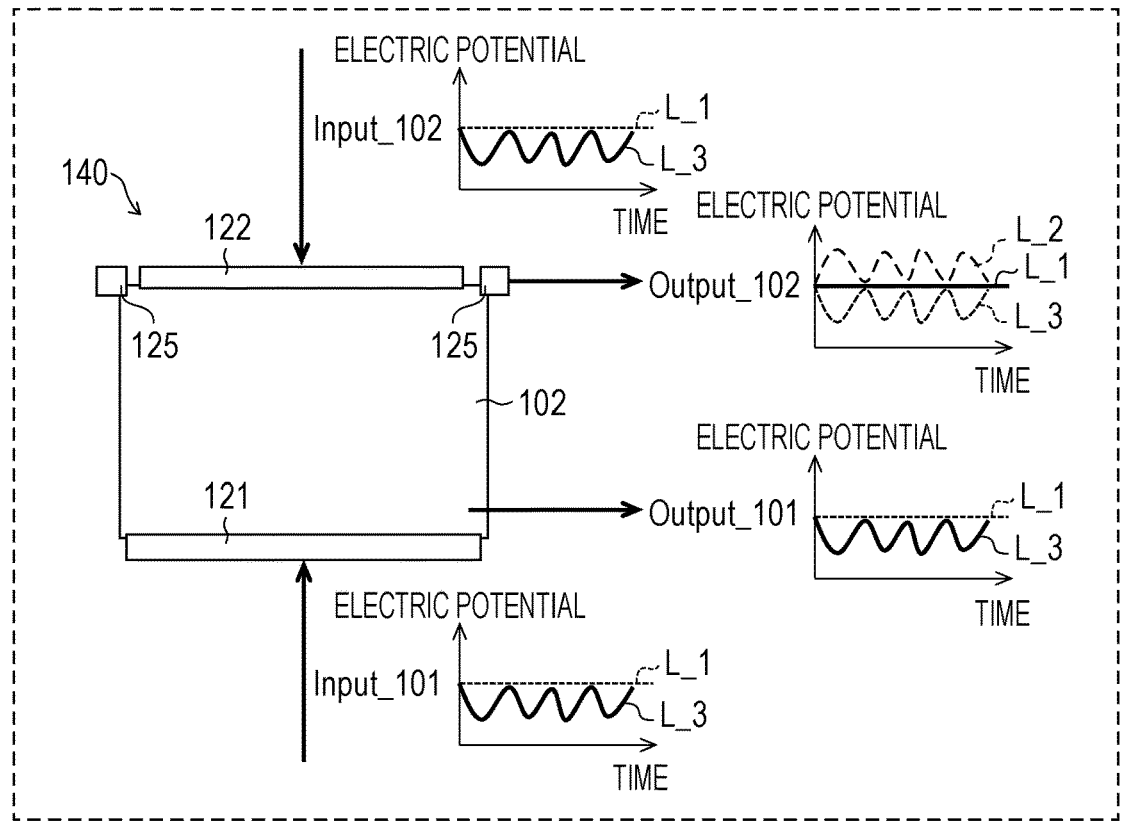

FIGS. 7A and 7B are diagrams illustrating examples of control for keeping the electric potential of the common electrode 102 such that the electric potential of the common electrode 102 corresponds to a target waveform L_1 in the comparative example illustrated in FIG. 6. Note that the third input signal Input_103 and the fourth input signal Input_104 are omitted. In the present specification, the target waveform L_1 is a flat waveform indicating a substantially consistent electric potential (DC electric potential).

FIG. 7A is a diagram illustrating an example of control in a case where the first input signal Input_101 and the second input signal Input_102 are the target waveform L_1. In this case, the first output signal Output_101 is the target waveform L_1. However, the second output signal Output_102 is affected by the driving of the scanning signal line G and the data signal line S due to the parasitic capacitance and the signal delay. Therefore, the second output signal Output_102 is a fluctuation waveform L_2 indicating a wavy electric potential (AC electric potential).

FIG. 7B is a diagram illustrating an example of control in a case where the second output signal Output_102 is the target waveform L_1. In this case, a reverse fluctuation waveform L_3 indicating a wavy electric potential in opposite phase is input as the first input signal Input_101 and the second input signal Input_102. The reverse fluctuation waveform L_3 is a waveform that cancels the fluctuation waveform L_2 affected by the parasitic capacitance and the signal delay so as to become the target waveform L_1. However, the first output signal Output_101 has not been affected, and thus becomes a reverse fluctuation waveform L_3.

As described above, in the active matrix substrate 140 of the comparative example, only one of the first output signal Output_101 and the second output signal Output_102 can be set as the target waveform L_1. Thus, it is not possible to set both of the signals as the target waveform L_1. Consequently, it is difficult to keep the electric potential of the common electrode 102 substantially uniform across the entire common electrode.

Feedback Control

Figure 3:
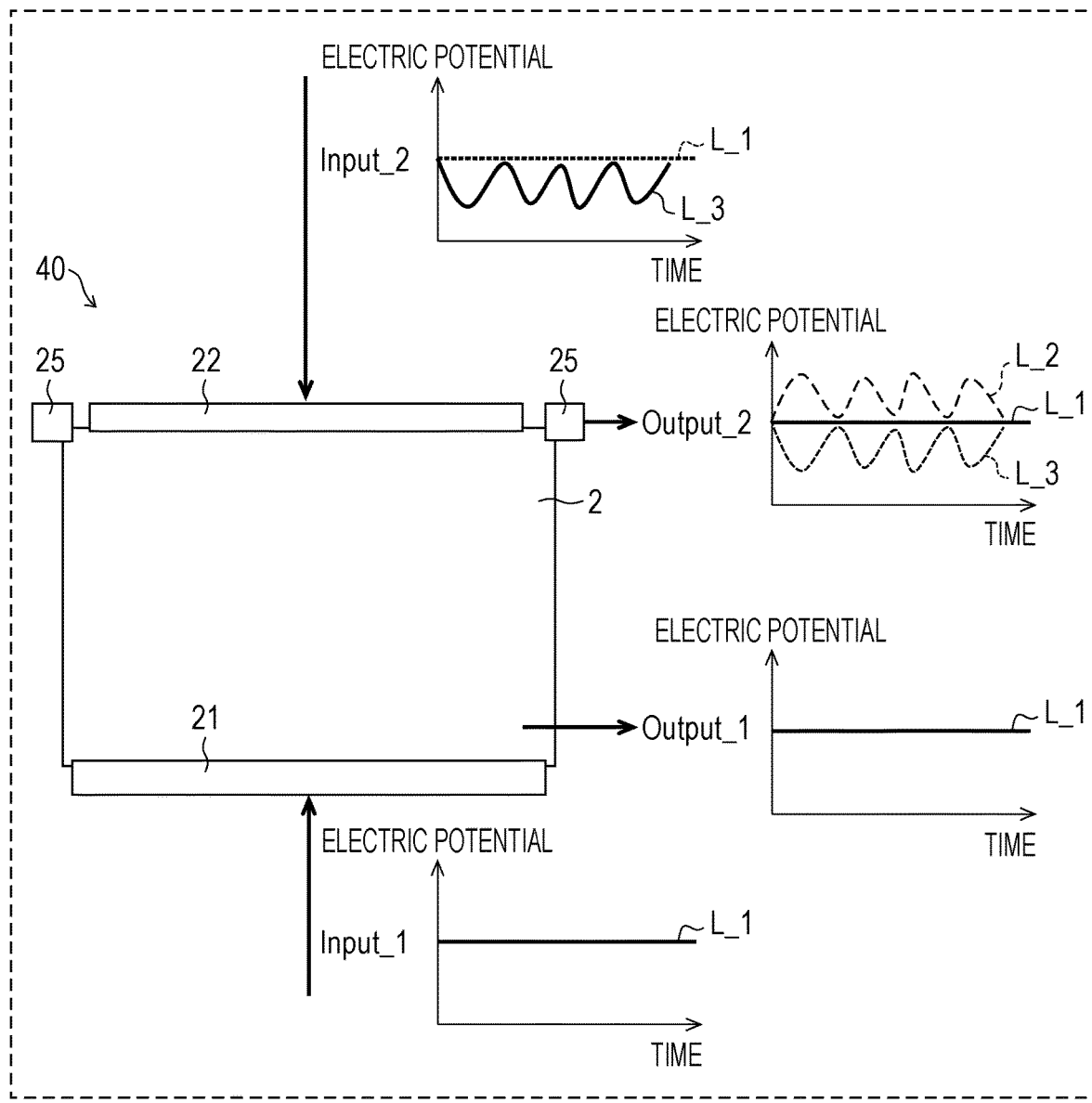
FIG. 3 is a diagram illustrating an example of control for keeping an electric potential of the common electrode such that the electric potential of the common electrode corresponds to a target waveform indicating a DC electric potential in the configuration example illustrated in FIG. 2.

FIG. 3 is a diagram illustrating an example of control for keeping the electric potential of the common electrode 2 such that the electric potential of the common electrode 2 corresponds to the target waveform L_1 indicating a substantially consistent electric potential (DC electric potential) in the configuration example illustrated in FIG. 2. Note that the third input signal Input_3 and the fourth input signal Input_4 are omitted. Further, the scanning signal lines G and the data signal lines S are driven.

For example, as illustrated in FIG. 3, the feedback circuit 30 may perform feedback control on the second input signal Input_2 such that the second output signal Output_2 substantially coincides with the target waveform L_1. Through such feedback control, the second input signal Input_2 supplied by the feedback circuit 30 may be set as the reverse fluctuation waveform L_3 which cancels the influence of driving of the scanning signal lines G and the data signal lines S. As described above, in the configuration example illustrated in FIG. 2, the first input signal Input_1 and the second input signal Input_2 may be different from each other. Therefore, the feedback circuit 30 may supply the first input signal Input_1 such that the first input signal Input_1 coincides with the target waveform L_1 at the same time. That is, the feedback circuit 30 may perform feedback control on the electric potential of the upper end portion and the electric potential of the vicinity of the common electrode 2 locally, that is, independently from the other portions (the lower end portion and the central portion of the common electrode 2).

In a case where the output electrode connected to the lower end portion of the common electrode 2 is disposed, the feedback circuit 30 may perform feedback control on the first input signal Input_1 such that the first output signal Output_1 substantially coincides with the target waveform L_1. In other words, the feedback circuit 30 may perform feedback control locally on the electric potential of the lower end portion and the electric potential of the vicinity of the common electrode 2.

By performing the control as illustrated in FIG. 3, both the first output signal Output_1 and the second output signal Output_2 can be made to coincide with the target waveform L_1.

Effects

As described above, in the active matrix substrate 40 according to Embodiment 1, the feedback circuit 30 is able to independently supply and control the first input signal Input_1 and the second input signal Input_2. Therefore, the feedback circuit is able to supply the first input signal Input_1 such that the first input signal Input_1 coincides with the target waveform L_1. At the same time, the feedback circuit is able to perform feedback control on the second input signal Input_2 such that the second output signal Output_2 coincides with the target waveform L_1. By performing such local feedback control, the influence on the common electrode 2 due to parasitic capacitance and signal delay is canceled. Therefore, the electric potential of the common electrode 2 can be stably kept at an electric potential of a control target indicated by the target waveform L_1 across the entire common electrode.

According to the liquid crystal display device 100 including the active matrix substrate 40, the electric potential of the common electrode 2 is stably kept. Therefore, the driving voltage for driving the pixel is also stabilized, and the greenish mode is unlikely to occur.

Embodiment 2

Another embodiment of the present disclosure will be described below. For convenience of description, members having the same functions as the members described in the above embodiments are denoted by the same reference numerals, and description thereof will not be repeated.

FIG. 1 also illustrates an example schematic configuration of a liquid crystal display device 100 according to Embodiment 2.

Figure 4:
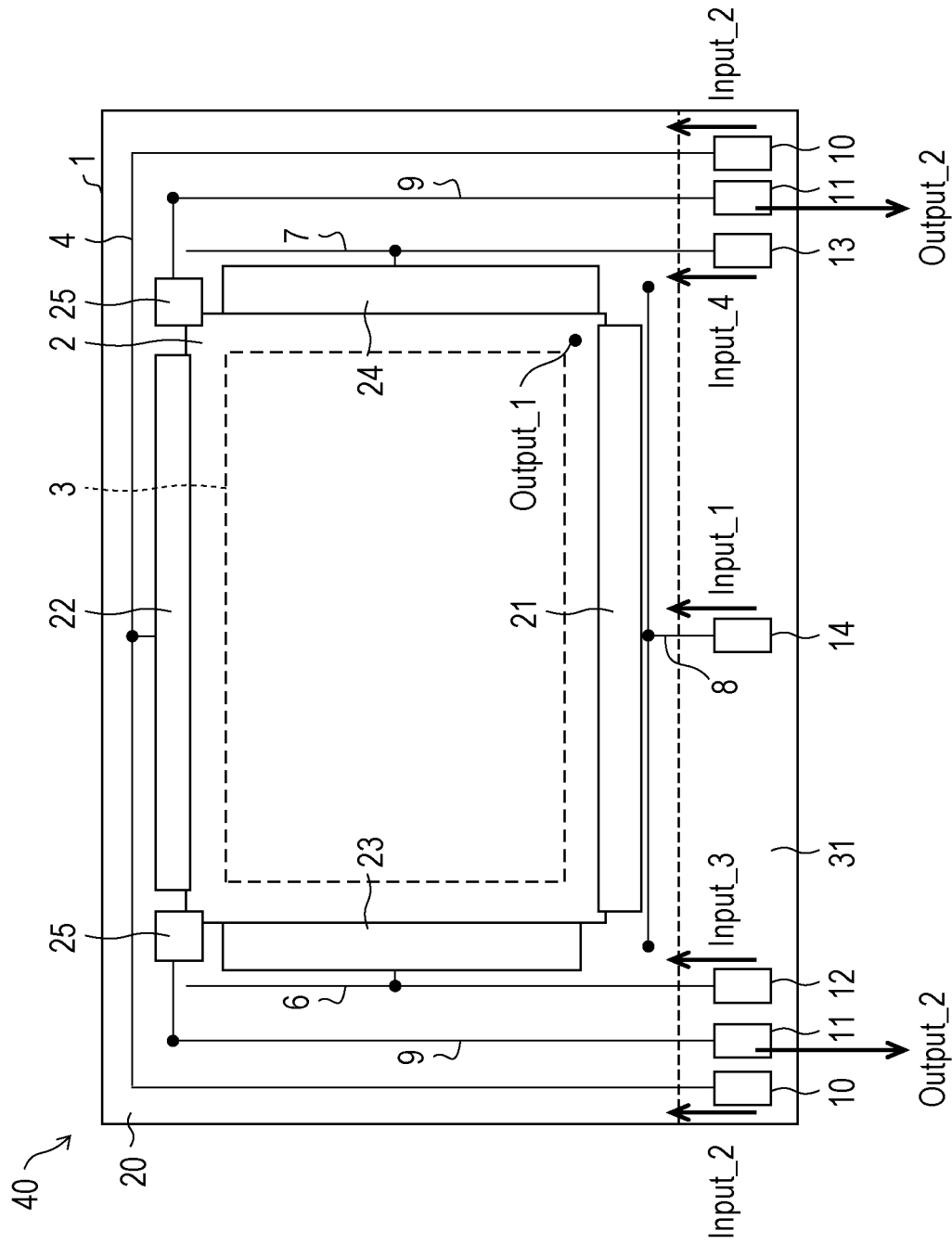
FIG. 4 is a diagram illustrating an example schematic configuration of the active matrix substrate illustrated in FIG. 1 according to another embodiment of the present disclosure, in which an input signal is input to the common electrode and an output signal is output from the common electrode.

FIG. 4 is a diagram illustrating an example schematic configuration of the active matrix substrate 40 illustrated in FIG. 1 according to Embodiment 2 of the present disclosure, in which an input signal is input to the common electrode 2 and an output signal is output from the common electrode 2. FIG. 4 illustrates only the common electrode 2 and constituent elements for controlling the electric potential of the common electrode 2, and does not illustrate other constituent elements.

Comparing FIG. 2 and FIG. 4, the active matrix substrate 40 according to Embodiment 2 is different from the above-mentioned active matrix substrate 40 according to Embodiment 1 in the following regard. It can be regarded that the left input electrode 23, the right input electrode 24, and the lower input electrode 21 are electrically separated from each other. On the other hand, the active matrix substrate 40 according to Embodiment 2 has the same configuration as the above-mentioned active matrix substrate 40 according to Embodiment 1 in other regards.

Therefore, in the configuration example illustrated in FIG. 4, the first input signal Input_1, the second input signal Input_2, the third input signal Input_3, and the fourth input signal Input_4 may be different from each other.

To be precise, the left input electrode 23 sends the input of the third input signal Input_3 to the left end portion of the common electrode 2. The third input signal Input_3 is attenuated by the wiring resistance of the left input wire 6 between the left input electrode 23 and the left input terminal 12. To be precise, the lower input electrode 21 sends the input of the first input signal Input_1 to the left end portion of the common electrode 2. The first input signal Input_1 is attenuated by the wiring resistance of the lower input wire 8 between the lower input electrode 21 and the lower input terminal 14. The wiring distance of the left input wire 6 between the left input electrode 23 and the left input terminal 12 is longer than the wiring distance of the lower input wire 8 between the lower input electrode 21 and the lower input terminal 14.

Therefore, to be precise, in the configuration example illustrated in FIG. 2, the third input signal Input_3, which is input to the common electrode 2 from the left input electrode 23, is more attenuated than the first input signal Input_1 which is input to the common electrode 2 from the lower input electrode 21. Likewise, to be precise, the fourth input signal Input_4, which is input to the common electrode 2 from the right input electrode 24, is also more attenuated than the first input signal Input_1 which is input to the common electrode 2 from the lower input electrode 21. Therefore, in the case where the first input signal Input_1 is supplied so as to coincide with the target waveform L_1 after being attenuated by the wiring resistance of the wires connected up to the lower input electrode 21, the third input signal Input_3 and the fourth input signal Input_4 do not coincide with the target waveform L_1 after being attenuated by the wiring resistances of the wires connected up to the left input electrode 23 and the right input electrode 24.

On the other hand, in the configuration example illustrated in FIG. 4, the feedback circuit 30 is able to supply the third input signal Input_3 and the fourth input signal Input_4 independently of the first input signal Input_1. Therefore, the feedback circuit 30 is able to amplify the third input signal Input_3 and the fourth input signal Input_4 in anticipation of attenuation caused by the wiring resistances.

Figure 5:
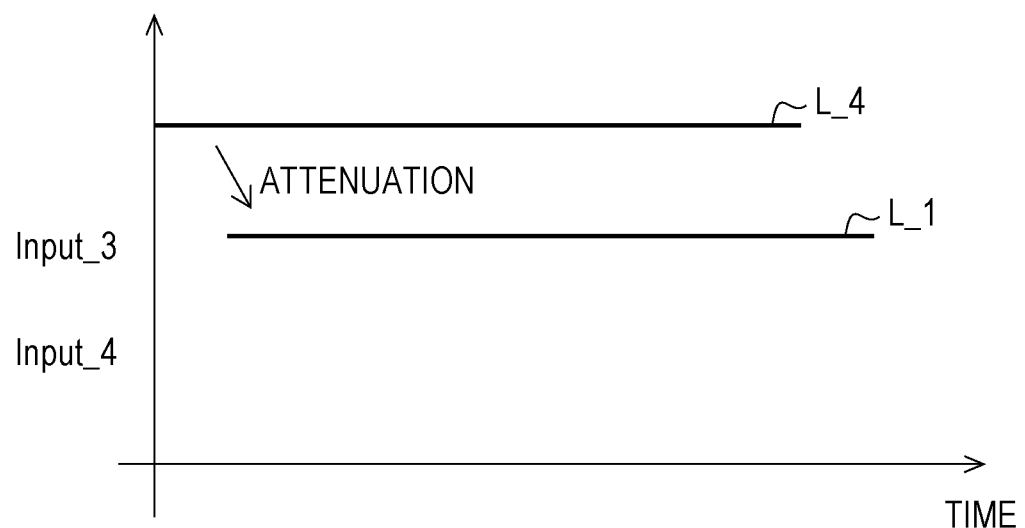
FIG. 5 is a diagram illustrating a waveform example before and after attenuation of a third input signal and a fourth input signal in an example of control for keeping an electric potential of the common electrode such that the electric potential of the common electrode corresponds to the target waveform in the configuration example illustrated in FIG. 4.

FIG. 5 is a diagram illustrating a waveform example before and after attenuation of the third input signal Input_3 and the fourth input signal Input_4 in an example of control for keeping the electric potential of the common electrode 2 such that the electric potential of the common electrode 2 corresponds to the target waveform L_1 in the configuration example illustrated in FIG. 4.

As illustrated in FIG. 5, the feedback circuit 30 is able to supply the third input signal Input_3 and the fourth input signal Input_4 with the amplified waveform L_4, which is obtained by amplifying the target waveform L_1, such that waveforms of the third input signal Input_3 and the fourth input signal Input_4 attenuated by the wiring resistance become the target waveform L_1 as a control target. With such amplification, in the configuration example illustrated in FIG. 4, the first input signal Input_1, the third input signal Input_3, and the fourth input signal Input_4 can be made to coincide with the target waveform L_1 after being attenuated by the wiring resistances of the wires connected up to the lower input electrode 21, the left input electrode 23, and the right input electrode 24. This coincidence helps keep the electric potential of the common electrode 2 substantially uniform across the entire common electrode.

In Embodiment 1 and Embodiment 2 described above, it is preferable that the first input signal Input_1 be also supplied from the feedback circuit 30 such that the first input signal Input_1 attenuated by the wiring resistance of the wires connected up to the first input electrode 21 coincides with the target waveform L_1 in anticipation of the attenuation of the first input signal Input_1 caused by the wiring resistance. It is also preferable that the feedback control be performed on the second input signal such that the output signal Output_2, which is not attenuated, coincides with the target waveform L_1 in anticipation of the attenuation of the output signal Output_2 and the second input signal Input_2 caused by the wiring resistances.

CONCLUSION

An active matrix substrate (40) according to Aspect 1 of the present disclosure is an active matrix substrate for a display device (100). The active matrix substrate is configured to include: a display region (3) and a picture-frame region (20). In the display region, a plurality of scanning signal lines (G), a plurality of data signal lines (S) crossing the scanning signal lines, and a common electrode (2) overlapping the scanning signal lines and the data signal lines and formed of a transparent conductive material are disposed. In the picture-frame region, a first input electrode (lower input electrode 21) electrically connected to a first end portion (lower end portion) of the common electrode, a second input electrode (upper input electrode 22) electrically connected to a second end portion (upper end portion) of the common electrode opposite to the first end portion, and an output electrode (25) electrically connected to the second end portion are disposed. The first input electrode, the second input electrode, and the output electrode are electrically connected to one another through only the common electrode.

According to the above configuration, the common electrode is formed of a transparent conductive material, and thus the electric conductivity is relatively low. Further, according to the above configuration, the first input electrode, the second input electrode, and the output electrode are electrically connected to one another through only the common electrode. For these reasons, the input and output signals of the first input electrode, the second input electrode, and the output electrode may be different from one another. Thus, the electric potentials thereof may be different from one another. That is, it can be regarded that the first input electrode, the second input electrode, and the output electrode are electrically separated from one another.

Due to the electrical separation mentioned above, the first input signal and the second input signal can be independently supplied. Here, the first input signal is input to the common electrode from the first input electrode, and the second input signal is input to the common electrode from the second input electrode. For example, the first input signal and/or the second input signal may be subjected to the feedback control such that the electric potentials of both the first end portion and the second end portion of the common electrode coincide with the electric potential as a control target. Through such local feedback control, the electric potential of the common electrode can be stably kept at the electric potential as a control target across the entire common electrode.

Therefore, according to the liquid crystal display device including the active matrix substrate having the above structure, the electric potential of the common electrode is stably kept. Therefore, the driving voltage for driving the pixel is also stable. As a result, the greenish mode is unlikely to occur.

In Aspect 1, the active matrix substrate (40) according to Aspect 2 of the present disclosure may be configured as follows. In the active matrix substrate, a third input electrode (left input electrode 23) electrically connected to a third end portion (left end portion) which is an end portion between the first end portion (lower end portion) and the second end portion (upper end portion) of the common electrode (2) is disposed in the picture-frame region (20). The third input electrode is electrically connected to the first input electrode (lower input electrode 21), the second input electrode (upper input electrode 22), and the output electrode (25) through only the common electrode.

According to the above configuration, it can be regarded that the third input electrode is electrically separated from the first input electrode, the second input electrode, and the output electrode. Due to the electrical separation mentioned above, the third input signal input to the common electrode from the third input electrode can be supplied independently from the first input signal and the second input signal. For example, the first input signal and the third input signal may be supplied such that both the first input signal, which is attenuated by the wiring resistance of the wires connected up to the first input electrode, and the third input signal, which is attenuated by the wiring resistance of the wires connected up to the third input electrode, coincide with the control target.

In Aspect 2, the active matrix substrate (40) according to Aspect 2 of the present disclosure may be configured as follows. In the active matrix substrate, a fourth input electrode (right input electrode 24) electrically connected to a fourth end portion (right end portion) is further disposed in the picture-frame region (20). The fourth end portion is a separate end portion between the first end portion (lower end portion) and the second end portion (upper end portion) of the common electrode (2) and is an end portion opposite to the third end portion left end portion). The fourth end portion may be configured to be electrically connected to the first input electrode (lower input electrode 21), the second input electrode (upper input electrode 22), the third input electrode (left input electrode 23), and the output electrode (25) through only the common electrode.

According to the above configuration, it can be regarded that the fourth input electrode is electrically separated from the first input electrode, the second input electrode, the third input electrode, and the output electrode. Due to the electrical separation mentioned above, the fourth input signal input to the common electrode from the fourth input electrode can be supplied independently from the first input signal, the second input signal, and the third input signal. For example, the first input signal and the third input signal may be supplied such that both the first input signal, which is attenuated by the wiring resistance of the wires connected up to the first input electrode, and the fourth input signal, which is attenuated by the wiring resistance of the wires connected up to the fourth input electrode, coincide with the control target.

In any one of Aspects 1 to 3, the active matrix substrate (40) according to Aspect 4 of the present disclosure may be configured as follows. In the active matrix substrate, a feedback circuit (30) is mounted in the picture-frame region (20). The feedback circuit supplies a first input signal to the first input electrode (lower input electrode 21) such that the first input signal (Input_1) coincides with a control target (target waveform L_1), supplies a second input signal (Input_2) to the second input electrode (upper input electrode 22), receives an output signal (Output_2) from the output electrode (25), and performs feedback control on the second input signal such that the output signal coincides with the control target.

According to the above configuration, the first input electrode is electrically connected to the first end portion of the common electrode, and the second input electrode and the output electrode are electrically connected to the second end portion of the common electrode. According to the above configuration, the first input signal coincides with the control target, and the feedback circuit performs feedback control on the second input signal such that the output signal coincides with the control target. For these, the first input signal and the second input signal are supplied such that the electric potentials of both the first end portion and the second end portion of the common electrode coincide with the electric potential as a control target. With this coincidence, the electric potential of the common electrode can be kept at the electric potential as a control target across the entire common electrode.

In Aspect 2 or 3, the active matrix substrate (40) according to Aspect 5 of the present disclosure may be configured as follows. In the active matrix substrate, a feedback circuit (30) is mounted in the picture-frame region (20). The feedback circuit supplies a first input signal to the first input electrode (lower input electrode 21) such that the first input signal (Input_1) coincides with a control target (target waveform L_1), supplies a second input signal (Input_2) to the second input electrode (upper input electrode 22), receives an output signal (Output_2) from the output electrode (25), performs feedback control on the second input signal such that the output signal coincides with the control target, and supplies a third input signal (Input_3) to the third input electrode (left input electrode 23) such that the third input signal coincides with the control target in the third input electrode.

According to the above configuration, the first input signal and the second input signal are supplied such that the electric potentials of both the first end portion and the second end portion of the common electrode coincide with the electric potential as a control target. Due to the coincidence, the electric potential of the common electrode can be kept at the electric potential as a control target across the entire common electrode.

According to the above configuration, the third input electrode is electrically connected to the third end portion of the common electrode, and the third input signal coincides with the control target at the third input electrode. That is, the feedback circuit supplies a signal, which is more amplified than the control target, as the third signal such that the third input signal attenuated by the wiring resistance of the wires connected up to the third input electrode or the like coincides with the control target. With such amplification, the attenuation caused by the wiring resistance or the like does not affect the control of the electric potential of the common electrode. Therefore, the electric potential of the common electrode can more easily be kept at the electric potential as the control target across the entire common electrode.

In Aspect 4 or 6, the active matrix substrate (40) according to Aspect 6 of the present disclosure may be configured as follows. In the active matrix substrate (40), the first end portion (lower end portion) of the common electrode is located between the second end portion (upper end portion) of the common electrode (2) and a partial region (feedback circuit mount region 31) of the picture-frame region (20) in which the feedback circuit (30) is mounted.

According to the above configuration, regarding the wiring distance from the feedback circuit 30 to each input electrode, the wiring distance to the first input electrode is shortest, and the wiring distance to the second input electrode is longest. Thus, among the end portions, the second end portion of the common electrode tends to have an electric potential which is highly likely to deviate from the control target. Accordingly, the feedback control is useful. Therefore, the efficiency of the control of the electric potential of the common electrode using the feedback control is high.

A display device (100) according to Aspect 7 of the present disclosure may be configured to include: the active matrix substrate (40) according to any of Aspects 1 to 6; a counter substrate; and a liquid crystal that is held between the active matrix substrate and the counter substrate.

According to the above configuration, the electric potential of the common electrode of the active matrix substrate is stably kept. Therefore, the driving voltage for driving the pixels of the display device is also stabilized. As a result, it is possible to realize a display device in which the greenish mode is unlikely to occur.

A control method according to Aspect 8 of the present disclosure is a control method of controlling the active matrix substrate (40) according to any one of Aspects 1 to 3. The method may be configured to include: supplying a first input signal (Input_1) to the first input electrode (lower input electrode 21) such that the first input signal coincides with a control target (L_1); supplying a second input signal (Input_2) to the second input electrode (upper input electrode 22); receiving an output signal (Output_2) from the output electrode (25); and performing feedback control on the second input signal such that the output signal coincides with the control target.

According to the above method, the electric potential of the common electrode can be kept at the electric potential of the control target across the entire common electrode as in Aspect 5.

A control method according to Aspect 9 of the present disclosure is a control method of controlling the active matrix substrate (40) according to Aspect 2 or 3. The method may be configured to include: supplying a first input signal (Input_1) to the first input electrode (lower input electrode 21) such that the first input signal coincides with a control target (L_1); supplying a second input signal (Input_2) to the second input electrode (upper input electrode 22); receiving an output signal (Output_2) from the output electrode (25); performing feedback control on the second input signal such that the output signal coincides with the control target; and supplying a third input signal (Input_3) to the third input electrode (left input electrode 23) such that the third input signal coincides with the control target (target waveform L_1) in the third input electrode.

According to the above method, the electric potential of the common electrode can more easily be kept at the electric potential as the control target across the entire common electrode as in Aspect 6.

The present disclosure is not limited to the above-mentioned embodiments and may be modified into various forms without departing from the technical scope of claims. The technical scope of the present disclosure also involves embodiments obtained by appropriately combining technical means disclosed in different embodiments. Furthermore, by combining technical means disclosed in the embodiments, new technical features can be formed.

The present disclosure contains subject matter related to that disclosed in Japanese Priority Patent Application JP 2017-220100 filed in the Japan Patent Office on Nov. 15, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An active matrix substrate for a display device, the active matrix substrate comprising:
    a display region in which (a) a plurality of scanning signal lines, (b) a plurality of data signal lines crossing the scanning signal lines, and (c) a common electrode overlapping the scanning signal lines, the common electrode being the data signal lines and formed of a transparent conductive material are disposed; and
    a picture-frame region in which (a) a first input electrode electrically connected to a first end portion of the common electrode, (b) a second input electrode electrically connected to a second end portion of the common electrode opposite to the first end portion, and (c) an output electrode electrically connected to the second end portion are disposed, wherein
    the first input electrode, the second input electrode, and the output electrode are electrically connected to one another through only the common electrode,
    wherein a feedback circuit is mounted in the picture-frame region,
    wherein the feedback circuit
        supplies a first input signal to the first input electrode such that the first input signal coincides with a target waveform,
        supplies a second input signal to the second input electrode,
        receives an output signal from the output electrode, and
        performs feedback control on the second input signal such that the output signal coincides with the target waveform.

2. The active matrix substrate according to claim 1,
    wherein a third input electrode electrically connected to a third end portion which is an end portion between the first end portion and the second end portion of the common electrode is disposed in the picture-frame region, and
    wherein the third input electrode is electrically connected to the first input electrode, the second input electrode, and the output electrode through only the common electrode.

3. The active matrix substrate according to claim 1, wherein
    the first end portion of the common electrode is located between the second end portion of the common electrode and a partial region of the picture-frame region in which the feedback circuit is mounted.

4. An active matrix substrate for a display device, the active matrix substrate comprising:
    a display region in which (a) a plurality of scanning signal lines, (b) a plurality of data signal lines crossing the scanning signal lines, and (c) a common electrode overlapping the scanning signal lines and the data signal lines, the common electrode being formed of a transparent conductive material, are disposed; and
    a picture-frame region in which (a) a first input electrode electrically connected to a first end portion of the common electrode, (b) a second input electrode electrically connected to a second end portion of the common electrode opposite to the first end portion, and (c) an output electrode electrically connected to the second end portion are disposed,
    wherein the first input electrode, the second input electrode, and the output electrode are electrically connected to one another through only the common electrode,
    wherein a third input electrode electrically connected to a third end portion which is an end portion between the first end portion and the second end portion of the common electrode is disposed in the picture-frame region, and wherein the third input electrode is electrically connected to the first input electrode, the second input electrode, and the output electrode through only the common electrode, wherein a feedback circuit is mounted in the picture-frame region, and wherein the feedback circuit supplies a first input signal to the first input electrode such that the first input signal coincides with a target waveform, supplies a second input signal to the second input electrode, receives an output signal from the output electrode, performs feedback control on the second input signal such that the output signal coincides with the target waveform, and supplies a third input signal to the third input electrode such that the third input signal coincides with the target waveform in the third input electrode.

5. The active matrix substrate according to claim 4, wherein the first end portion of the common electrode is located between the second end portion of the common electrode and a partial region of the picture-frame region in which the feedback circuit is mounted.

6. A display device comprising:

an active matrix substrate;

wherein the active matrix substrate comprises:

a display region in which (a) a plurality of scanning signal lines, (b) a plurality of data signal lines crossing the scanning signal lines, and (c) a common electrode overlapping the scanning signal lines and the data signal lines, the common electrode being formed of a transparent conductive material, are disposed; and a picture-frame region in which (a) a first input electrode electrically connected to a first end portion of the common electrode, (b) a second input electrode electrically connected to a second end portion of the common electrode opposite to the first end portion, and (c) an output electrode electrically connected to the second end portion are disposed, wherein the first input electrode, the second input electrode, and the output electrode are electrically connected to one another through only the common electrode, wherein a feedback circuit is mounted in the picture-frame region, wherein the feedback circuit supplies a first input signal to the first input electrode such that the first input signal coincides with a target waveform, supplies a second input signal to the second input electrode, receives an output signal from the output electrode, and performs feedback control on the second input signal such that the output signal coincides with the target waveform, wherein the display device comprises a counter substrate; and a liquid crystal that is held between the active matrix substrate and the counter substrate.

* * * * *